(12) United States Patent
Huang-Jung

(10) Patent No.: US 8,087,364 B2
(45) Date of Patent: Jan. 3, 2012

(54) ASSEMBLY OF PALLET COMPONENT AND FASTENERS

(76) Inventor: Chou Huang-Jung, Gueiren Township, Tainan County (TW)

( * ) Notice: Subject to any disclaimer, the term of this patent is extended or adjusted under 35 U.S.C. 154(b) by 91 days.

(21) Appl. No.: 12/731,231

(22) Filed: Mar. 25, 2010

(65) Prior Publication Data
US 2011/0232538 A1 Sep. 29, 2011

(51) Int. Cl.
*B65D 19/12* (2006.01)
(52) U.S. Cl. .................. 108/56.3; 108/56.1; 108/902
(58) Field of Classification Search .............. 108/56.1, 108/56.3, 901, 902, 51.3, 51.11, 54.1
See application file for complete search history.

(56) References Cited

U.S. PATENT DOCUMENTS

| | | | | |
|---|---|---|---|---|
| 2,918,241 A * | 12/1959 | Maher | | 108/56.1 |
| 2,930,560 A * | 3/1960 | Carnwath et al. | | 108/56.1 |
| 2,958,494 A * | 11/1960 | Lovegreen | | 108/51.3 |
| 3,316,861 A * | 5/1967 | Dailey | | 108/56.3 |
| 3,878,796 A * | 4/1975 | Morrison | | 108/56.1 |
| 4,128,253 A * | 12/1978 | Powers | | 280/79.11 |
| 4,267,781 A * | 5/1981 | Powers | | 108/56.1 |
| 4,316,419 A * | 2/1982 | Cupido | | 108/56.1 |
| 5,007,352 A * | 4/1991 | Calkoen | | 108/56.1 |
| 5,097,951 A * | 3/1992 | Pigott et al. | | 206/386 |
| 5,388,533 A * | 2/1995 | Pigott et al. | | 108/56.3 |
| 5,413,052 A * | 5/1995 | Breezer et al. | | 108/56.1 |
| 5,417,167 A * | 5/1995 | Sadr | | 108/57.19 |
| 5,445,084 A * | 8/1995 | Durand | | 108/56.3 |
| 5,456,189 A * | 10/1995 | Belle Isle | | 108/57.17 |
| 5,676,067 A * | 10/1997 | Breindel | | 108/56.1 |
| 5,941,179 A * | 8/1999 | Herring | | 108/57.19 |
| 6,021,721 A * | 2/2000 | Rushton | | 108/56.3 |
| 6,446,563 B1 * | 9/2002 | Ohanesian | | 108/57.25 |
| 6,516,730 B1 * | 2/2003 | Mason | | 108/55.1 |
| 7,004,083 B2 * | 2/2006 | Ramirez von Holle et al. | | 108/57.25 |
| 7,490,561 B1 * | 2/2009 | Chou | | 108/56.1 |
| 7,578,244 B2 * | 8/2009 | Williams, Jr. | | 108/56.3 |
| 2008/0066657 A1 * | 3/2008 | Kuo | | 108/57.19 |
| 2008/0115699 A1 * | 5/2008 | Miller et al. | | 108/56.1 |

* cited by examiner

*Primary Examiner* — Jose V Chen
(74) *Attorney, Agent, or Firm* — Alan Kamrath; Kamrath IP Lawfirm, PA

(57) ABSTRACT

An assembly of a pallet component and fasteners makes a pallet on which various kinds of objects can be placed and which is movable by a forklift. The pallet component includes two outer unit members and an intermediate connector. Each outer unit member has an inner side formed with spaced projections and concavely provided with spaced receiving recesses adjacent thereto. The spaced projections of each outer unit member correspond in position to and are therefore receivable in the spaced receiving recesses of the other outer unit member. The intermediate connector is bilaterally provided with connecting sections that have different orientations. The working end of each connecting section has spaced projections and spaced receiving recesses adjacent thereto so as to connect with the corresponding outer unit member. Thus, a pallet can be easily made according to the widths of objects to be placed on the pallet.

5 Claims, 15 Drawing Sheets

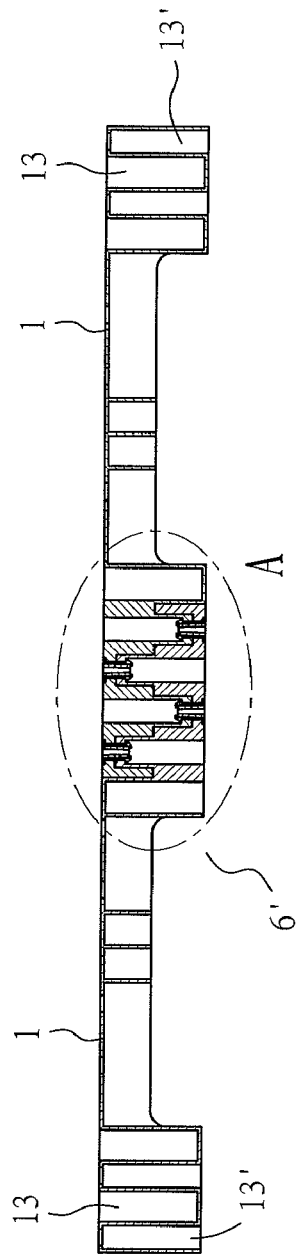
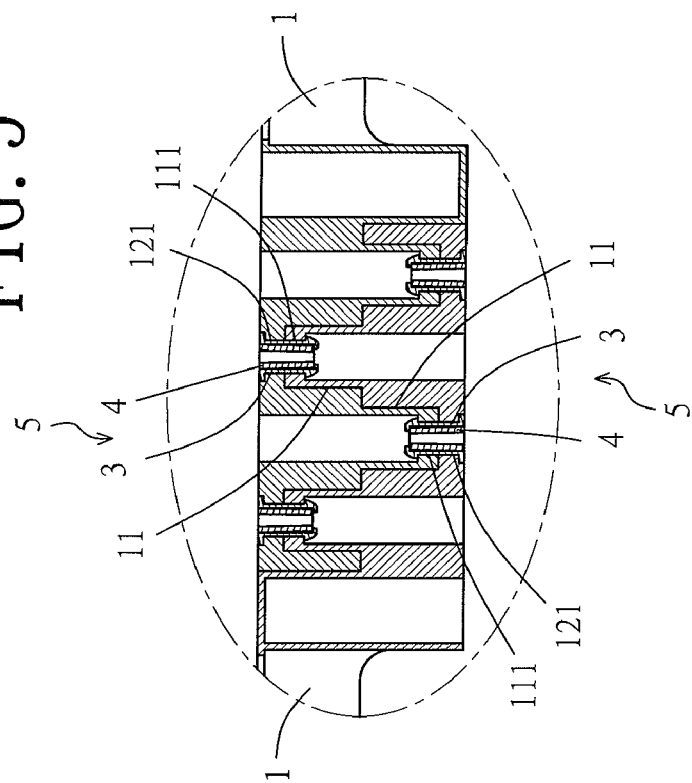

ASSEMBLY OF PALLET COMPONENT AND FASTENERS

BACKGROUND OF THE INVENTION

1. Technical Field

The present invention relates to pallets capable of supporting various kinds of objects and movable by a forklift to desired locations. More particularly, the present invention relates to an assembly of a pallet component and fasteners that is applicable to making a pallet. The pallet component is composed of at least two structural elements, depending on the required dimension of the pallet component, so as to facilitate the making of a stable pallet in accordance with the widths of objects to be placed on the pallet. Thus, not only are the mold manufacturing costs and production costs of the pallet significantly reduced, but also a plurality of such pallet components can be stacked in a space-efficient way during transportation.

2. Description of Related Art

Conventional pallets for supporting various kinds of objects are typically made by cutting wood boards to the desired sizes and nailing the wood boards according to predetermined configurations. As wood pallets are costly, plastic injection-molded pallets have been developed for supporting finished goods and being transported by a forklift. The injection molding of plastic pallets requires molds that are manufactured in conformity with the specifications of the pallets, as well as a machine capable of accommodating the molds so that a plastic material can be injection-molded therein. Therefore, if pallets of relatively large sizes are to be made by injection molding, the mold manufacturing costs will be high, and the injection molding machine must be increased in size. Moreover, as pallets of different dimensions must be formed in different molds and different injection molding machines, the overall equipment costs will be considerable. Besides, if a factory is not spacious enough for installing injection molding machines designed for making large pallets, the factory is simply unsuitable for producing such large pallets. Furthermore, large pallets usually cannot be stacked in a space-efficient way and therefore take up much space.

BRIEF SUMMARY OF THE INVENTION

As an improvement over the aforesaid inconveniences of manufacturing and transporting the conventional large pallets, the present invention provides a novel pallet configuration in which pallet components of the desired dimensions are each composed of at least two structural elements so as to facilitate the making of a stable pallet according to the widths of objects to be placed on the pallet. Thus, not only are the mold manufacturing costs and production costs of the pallet significantly lowered, but also the pallet components can be stacked efficiently during transportation to save space.

A primary object of the present invention is to provide a pallet component for forming a pallet. The pallet component is composed of at least two structural elements according to the desired dimension of the pallet component. The pallet component includes two outer unit members and an intermediate connector. Each of the two outer unit members has an inner side formed with spaced projections and concavely provided with spaced receiving recesses adjacent thereto. The spaced projections of each outer unit member correspond in position to and therefore can be received in the spaced receiving recesses of the other outer unit member, respectively. The intermediate connector is bilaterally provided with connecting sections having different orientations. Each connecting section has a working end extended with spaced projections and concavely provided with receiving recesses adjacent thereto. When the intermediate connector is assembled with the two outer unit members, the spaced projections of the intermediate connector are received in the spaced receiving recesses of the outer unit members, respectively. Hence, a stable pallet can be conveniently formed according to the width of objects to be placed on the pallet, thereby substantially reducing the mold manufacturing costs and production costs of the pallet. Also, the pallet components can be stacked in a space-efficient way during transportation.

A second object of the present invention is to provide a fastener for fastening two unit members and at least one optional intermediate connector that form a pallet component. The fastener includes an engaging sleeve and a pressing insert, both formed of a tough plastic material. The engaging sleeve is penetrated by a hole. In addition, one end of the engaging sleeve is formed as a resilient tenon section having an opening, while the opposite end of the engaging sleeve is formed with a pressing flange. The pressing insert is provided with an upper section having a first outer diameter and a lower section having a second outer diameter, with the first outer diameter being larger than the second outer diameter. Furthermore, both the first and second outer diameters must be larger than the diameter of a hollow column formed by the hole penetrating the engaging sleeve. The fastener is installed in the pallet component in the following manner. To begin with, the resilient tenon section at one end of the engaging sleeve is passed through corresponding through-holes in the two unit members or corresponding through-holes in one of the unit members and one intermediate connector, such that the upper and lower ends of the engaging sleeve press respectively against the two unit members or against the one unit member and the one intermediate connector. Following that, the pressing insert is inserted into the hole of the engaging sleeve. Thus, the fastener is installed between the two unit members or between the one unit member and the one intermediate connector in a convenient and rapid manner to achieve tight and secure fastening.

A third object of the present invention is to provide the aforesaid plastic engaging sleeve to be installed between the two unit members or between one of the unit members and one of the at least one intermediate connector. The engaging sleeve is formed by an upper mold manufactured according to the hole penetrating the engaging sleeve, a lower mold manufactured according to the resilient tenon section provided at one end of the engaging sleeve and having the opening, and a left mold and a right mold that are manufactured according to the pressing flange extending from the opposite end of the engaging sleeve. Thus, the engaging sleeve can be easily removed from the molds after being formed.

A fourth object of the present invention is to provide the aforesaid holed plastic engaging sleeve of the fastener to be installed between the two unit members or between one of the unit members and one intermediate connector. The opening of the resilient tenon section at one end of the engaging sleeve is bilaterally formed with discontinuous sectors, and the pressing flange protruding from the opposite end of the engaging sleeve is bilaterally formed with discontinuous sectors that alternate in position with the discontinuous sectors at the opening of the resilient tenon section. Thus, the plastic engaging sleeve, together with the plastic pressing insert inserted therein, is capable of tightly and securely holding the assembled pallet component together.

A fifth object of the present invention is to provide the plastic engaging sleeve that has the configuration described in the previous paragraph and is to be installed between the two unit members or between one of the unit members and one intermediate connector. The engaging sleeve is formed by a lower mold manufactured according to the discontinuous sectors bilaterally formed at the opening of the resilient tenon section at one end of the engaging sleeve, and an upper mold manufactured according to the hole of the engaging sleeve and the discontinuous sectors which are bilaterally formed at the pressing flange extending from the upper end of the engaging sleeve and which alternate in position with the discontinuous sectors at the opening of the resilient tenon section at the lower end of the engaging sleeve. Thus, the number of molds for forming the plastic engaging sleeve is reduced.

BRIEF DESCRIPTION OF THE SEVERAL VIEWS OF THE DRAWINGS

The invention as well as a preferred mode of use, further objects, and advantages thereof will be best understood by referring to the following detailed description of illustrative embodiments in conjunction with the accompanying drawings, in which:

FIG. 2A is a partial enlarged view of FIG. 2;

FIG. 5 is a sectional view taken along line 50-50 in FIG. 4;

FIG. 5A is a partial enlarged view of FIG. 5;

FIG. 9A is a partial enlarged view of FIG. 9;

DETAILED DESCRIPTION OF THE INVENTION

Figure 1A:
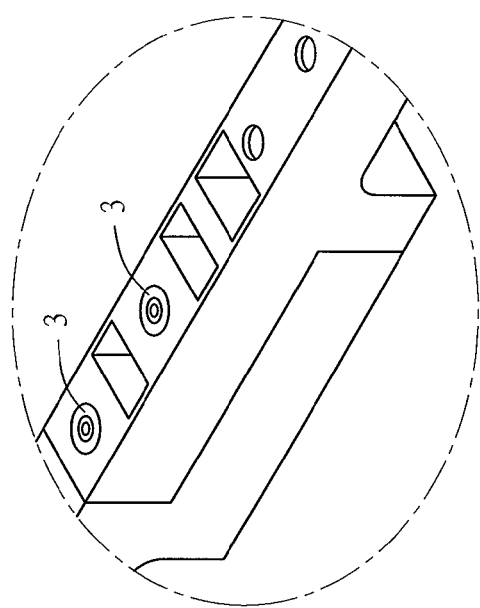
FIG. 1A is a partial enlarged view of FIG. 1.
Figure 1:
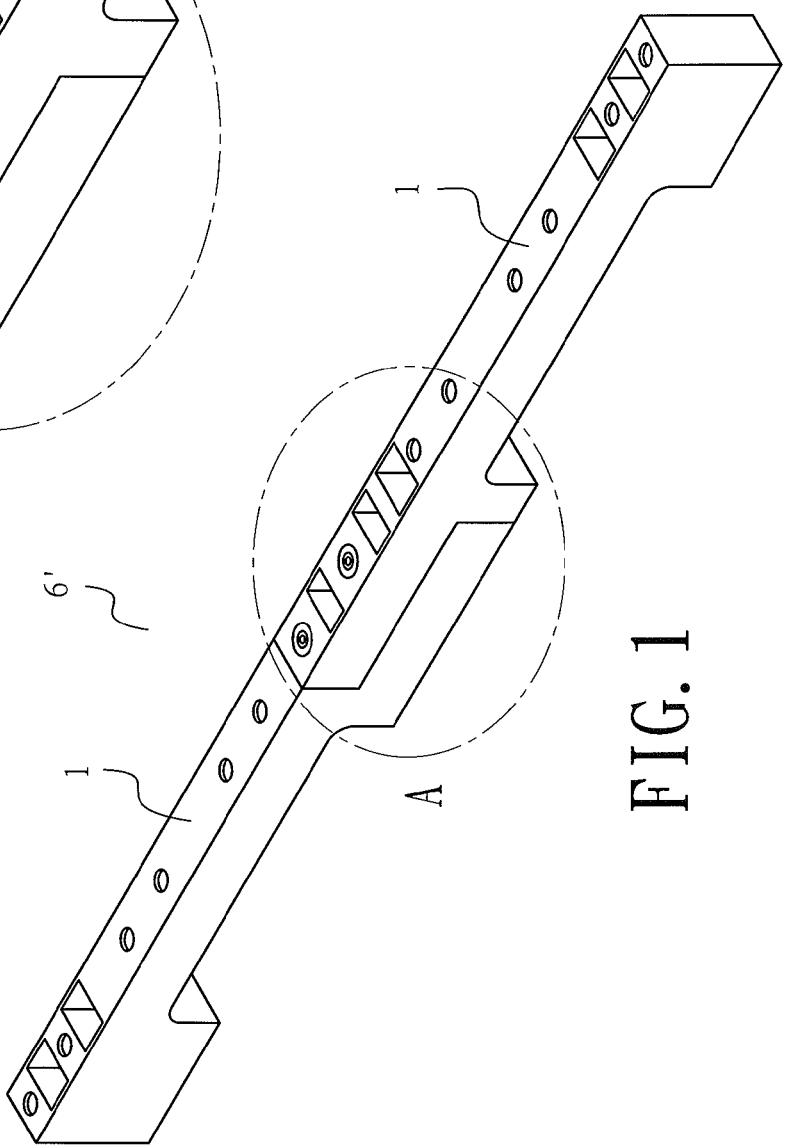
FIG. 1 is a perspective view of a pallet component having a relatively short configuration according to the present invention.
Figure 6:
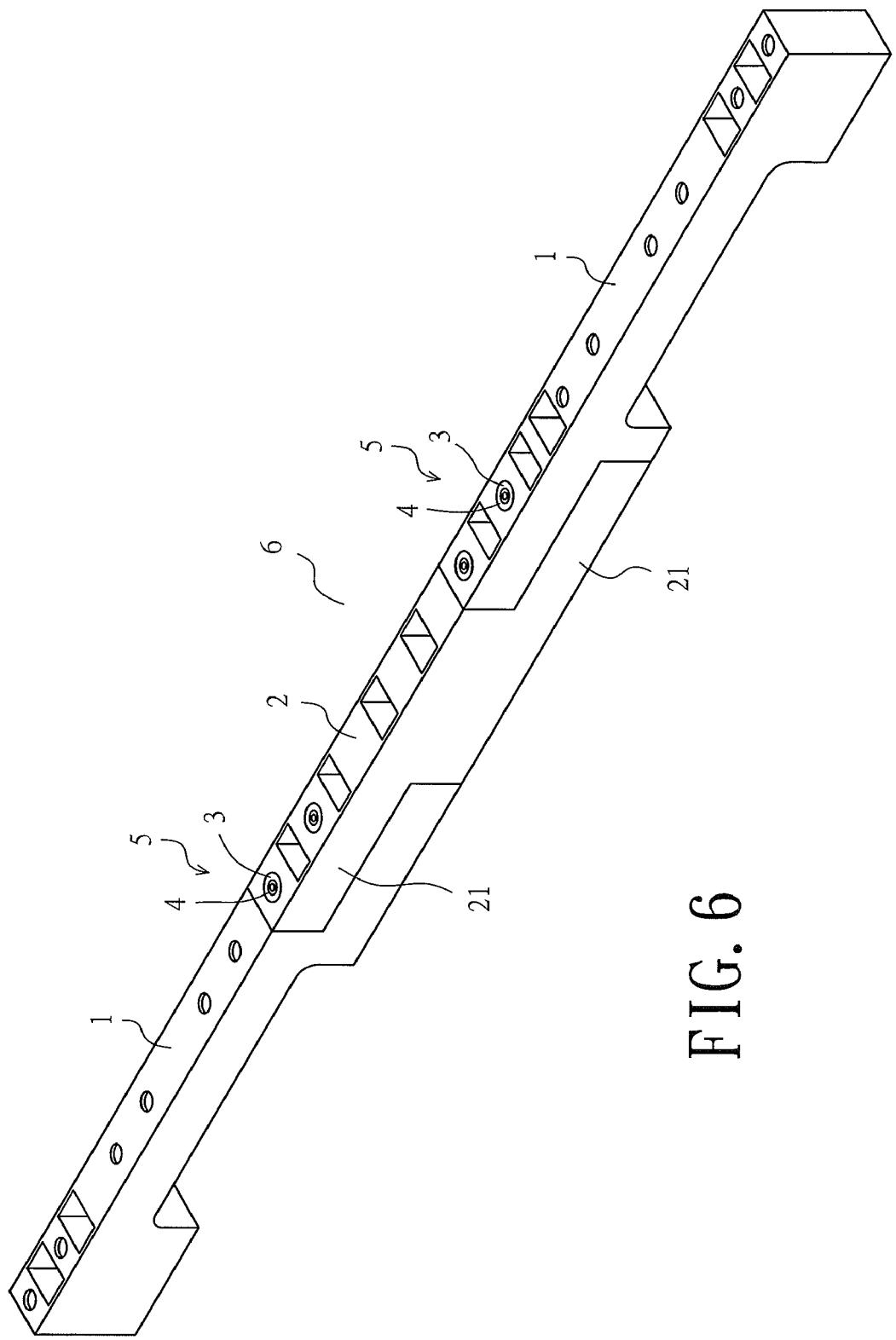
FIG. 6 is a perspective view of a pallet component having a relatively long configuration according to the present invention.

The present invention discloses an assembly of a pallet component and fasteners, as shown in FIG. 1 and FIG. 6. The disclosed assembly is configured for forming a pallet on which various kinds of objects can be placed and which can be moved by a forklift. As shown in the drawings, a pallet component 6 is assembled from at least two structural elements, depending on the desired dimension of the pallet component 6. For instance, the pallet component 6' in FIG. 1 has a relatively short configuration while the pallet component 6 in FIG. 6 has a relatively long configuration. The pallet component 6 includes two outer unit members 1 and an intermediate connector 2.

Figure 2:
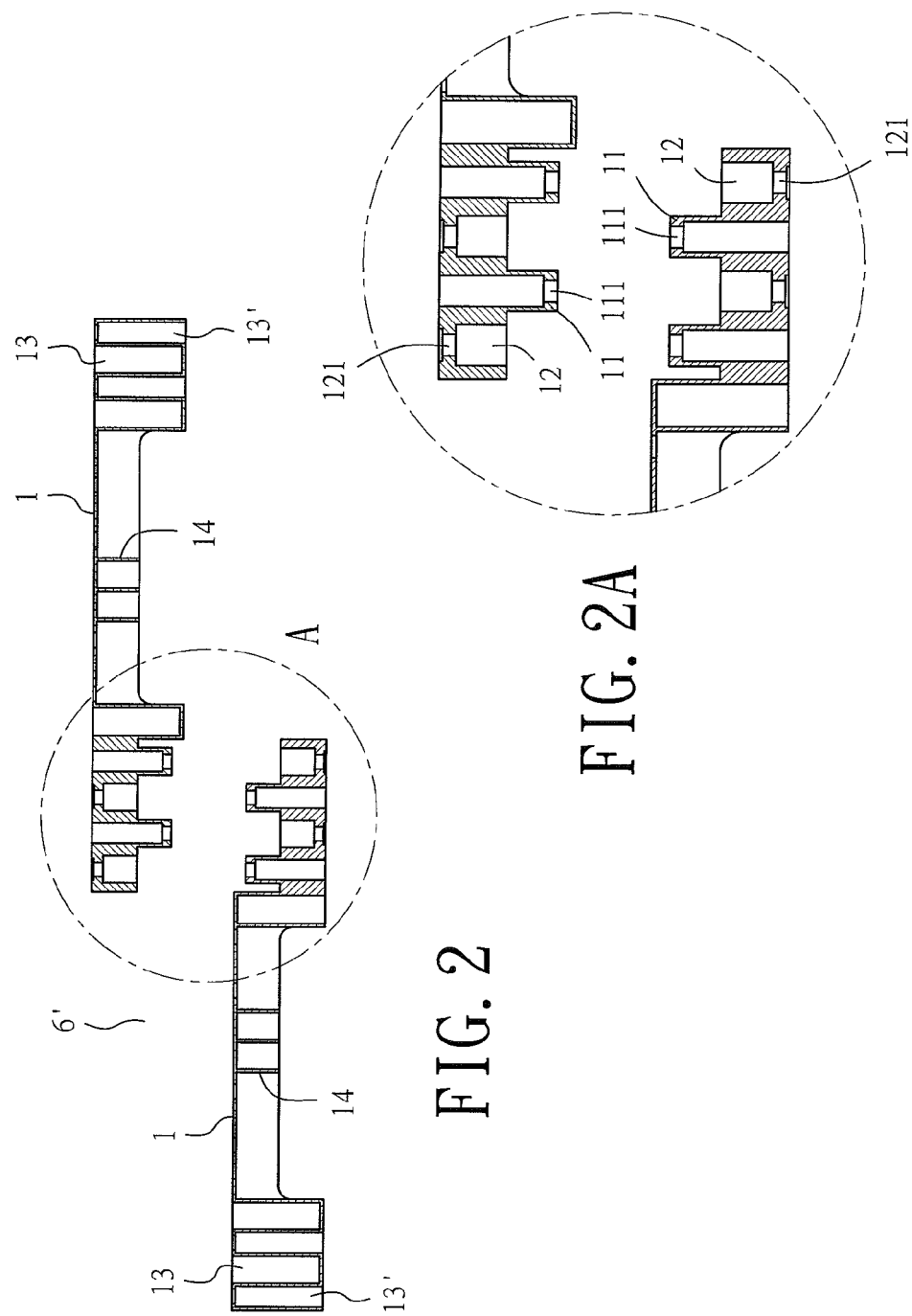
FIG. 2 is an exploded sectional view of the pallet component shown in FIG. 1.
Figure 3:
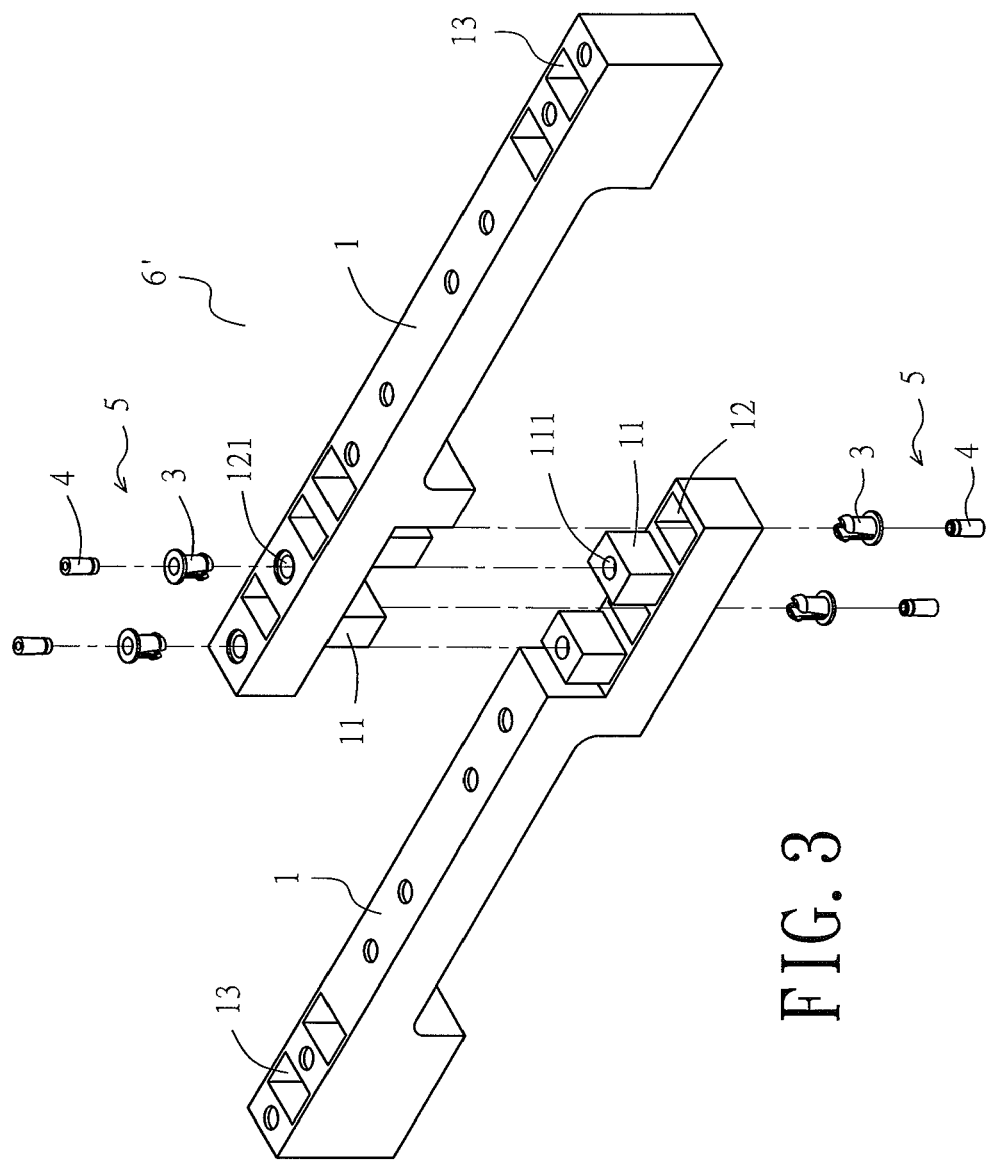
FIG. 3 is an exploded perspective view of the pallet component shown in FIG. 1.
Figure 7:
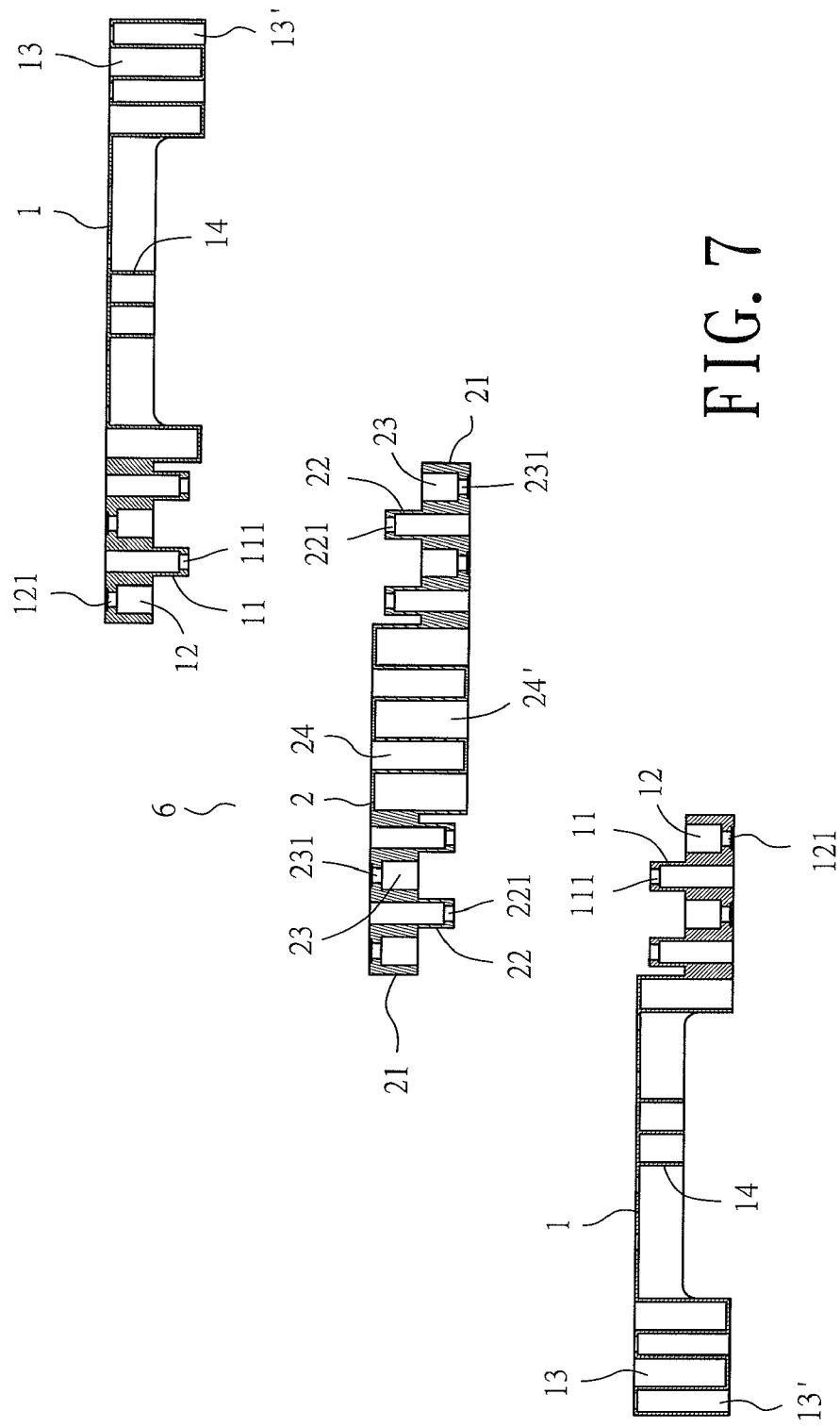
FIG. 7 is an exploded sectional view of the pallet component shown in FIG. 6.
Figure 8:
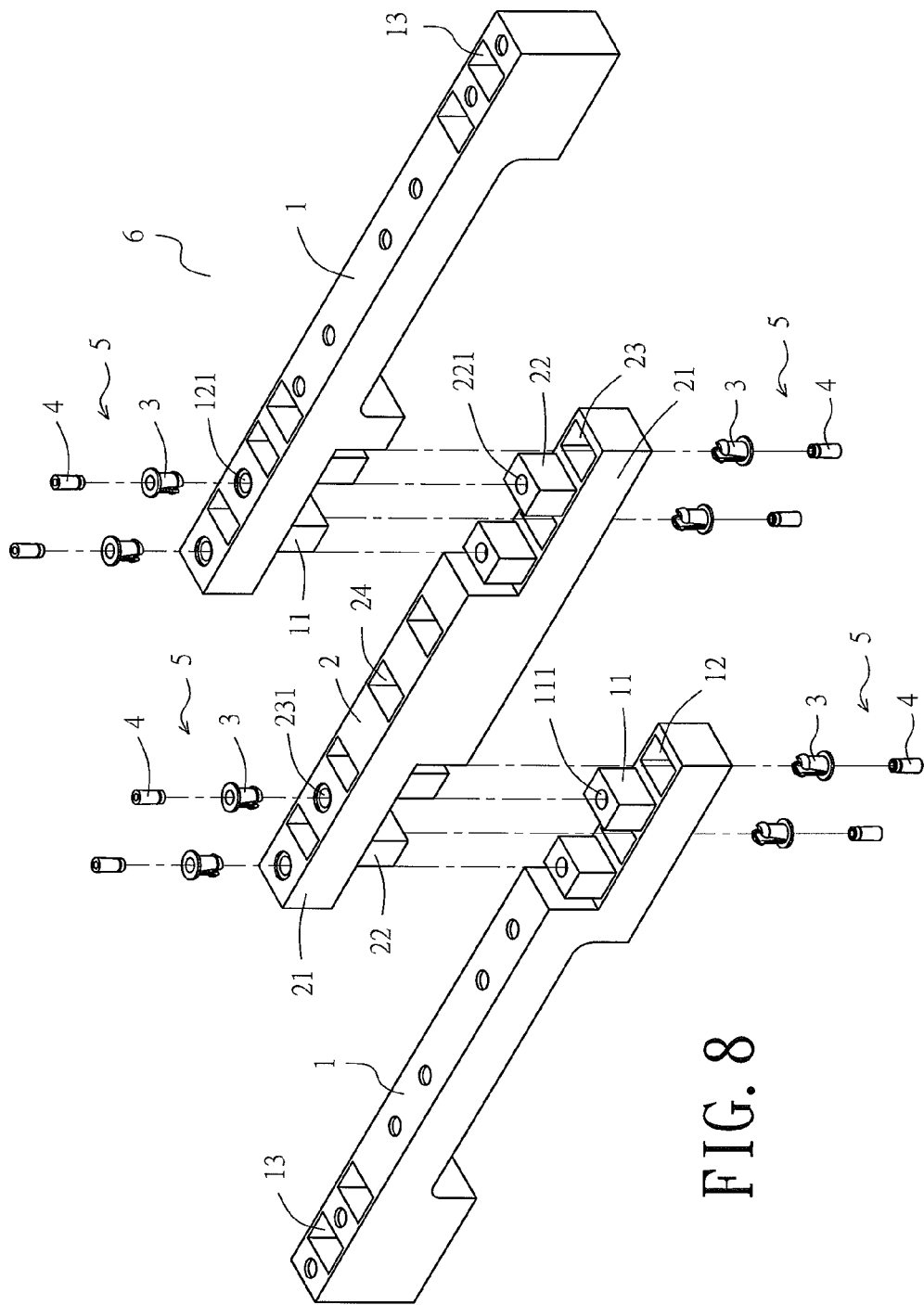
FIG. 8 is an exploded perspective view of the pallet component shown in FIG. 6.

As shown in FIG. 3 and FIG. 8, the two outer unit members 1 are pallet elements at the outer ends of the assembly. Each of the two outer unit members 1 has an inner side formed with spaced projections 11 and concavely provided with spaced receiving recesses 12 adjacent thereto. The spaced projections 11 of each outer unit member 1 correspond in position to the spaced recesses 12 of the other outer unit member 1. Referring to FIG. 2 and FIG. 7, the spaced projections 11 of each unit member 1 are downwardly open, and each has an upper end formed with a through-hole 111. Meanwhile, the receiving recesses 12 of each unit member 1 each has a bottom formed with a through-hole 121. Besides, each unit member 1 has an outer top end formed with at least one cavity 13 arranged in a spaced manner, as shown in FIG. 3 and FIG. 8, and an outer bottom end formed with at least one cavity 13', as shown in FIG. 2 and FIG. 7. Each unit member 1 also has a middle section which is downwardly formed with a plurality of reinforcing ribs 14.

Referring to FIG. 8, the intermediate connector 2 is a pallet element configured for connecting the two outer unit members 1. The connector 2 is bilaterally provided with connecting sections 21 having different orientations. Each connecting section 21 has a working end extended with spaced projections 22 and concavely provided with receiving recesses 23 adjacent thereto. As shown in FIG. 7, the spaced projections 22 formed on the connector 2 each has an end provided with a through-hole 221 and an opposite open end, and the receiving recesses 23 adjacent to the spaced projections 22 each has an end formed with a through-hole 231. Furthermore, the connector 2 has a middle section whose upper end is formed with at least one cavity 24 arranged in a spaced manner, as shown in FIG. 8, and whose bottom end is formed with at least one cavity 24', as shown in FIG. 7.

Figure 9:
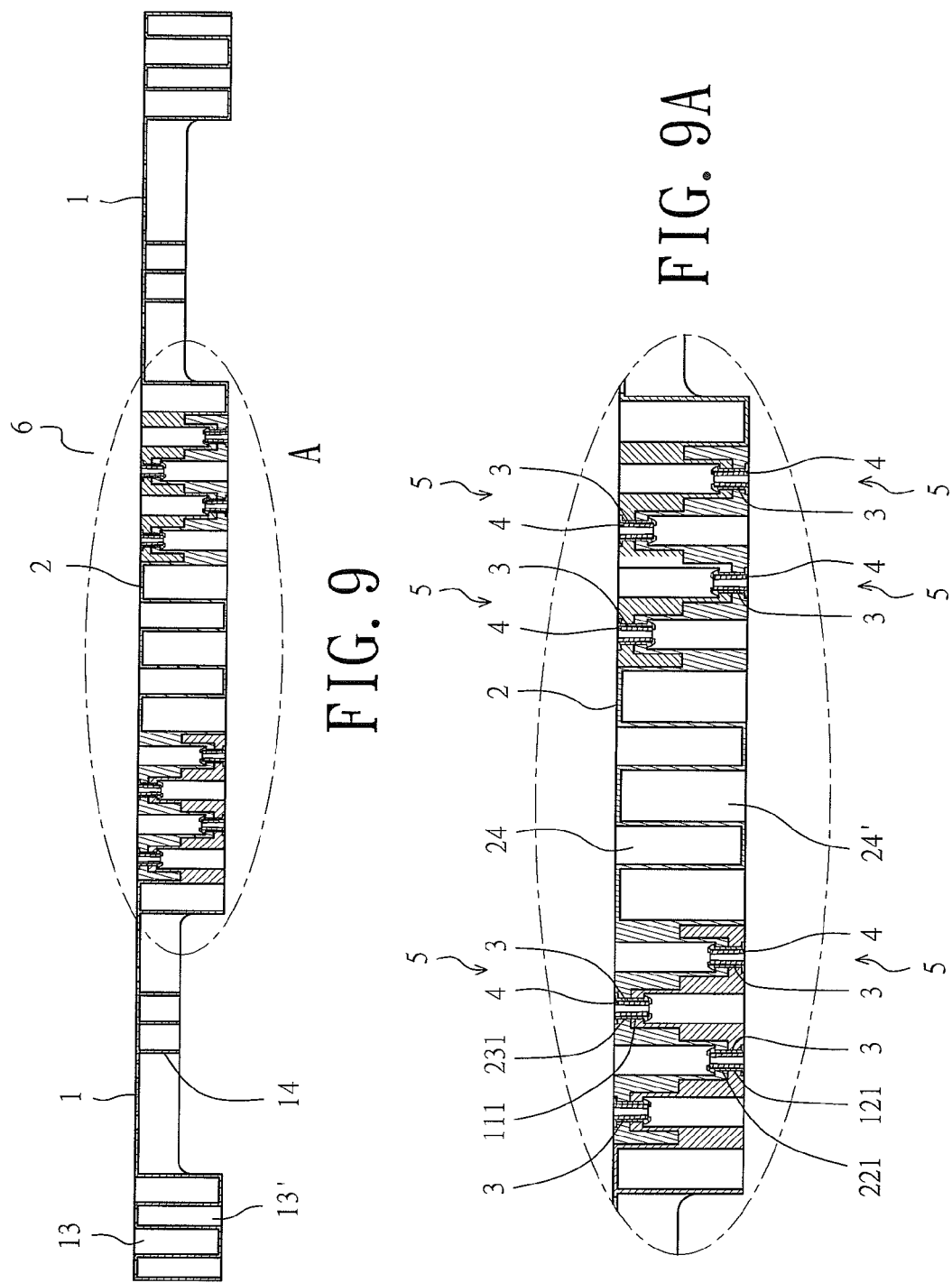
FIG. 9 is a sectional front view of the pallet component shown in FIG. 6.

Assembly of the two outer unit members 1 and the intermediate connector 2 is described hereinafter with reference to FIG. 7 and FIG. 8. To begin with, the spaced projections 22 extending from the working end of each of the differently oriented connecting sections 21 bilaterally provided on the connector 2 are received in the spaced receiving recesses 12 of the corresponding unit member 1, respectively, as shown more clearly in FIG. 9. At the same time, the receiving recesses 23 of the connector 2 that are adjacent to the spaced projections 22 are inserted by the spaced projections 11 of the corresponding unit members 1, respectively. Then, a plurality of fasteners 5 are inserted respectively into the now connected through-holes 231, 111 and 121, 221 of the connector 2 and the two outer unit members 1, thereby completing the pallet component 6 of a desired dimension, as shown in FIG. 6 and FIG. 9.

Figure 4:
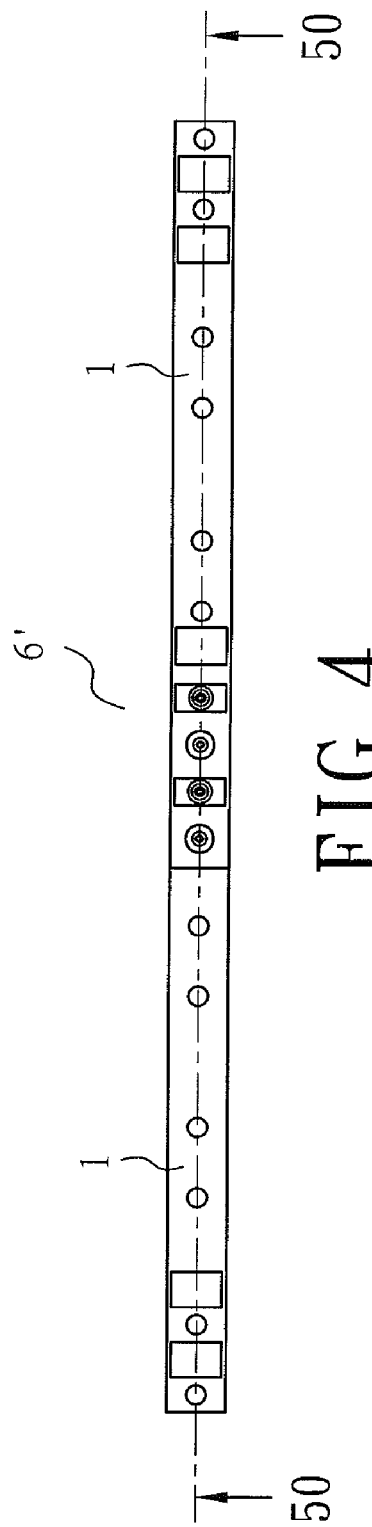
FIG. 4 is a top view of the pallet component shown in FIG. 1.

Referring to FIG. 2 and FIG. 3, to assemble the pallet component 6' of the relatively short configuration, the spaced projections 11 of the unit member 1 on one side are directly inserted into the corresponding spaced receiving recesses 12 of the unit member 1 on the other side, as shown more clearly in FIG. 5. Then, a plurality of fasteners 5 are inserted respectively into the now connected through-holes 121, 111 of the two outer unit members 1. Thus, the pallet component 6' of a desired dimension is formed, as shown in FIGS. 1, 4, and 5.

Figure 10:
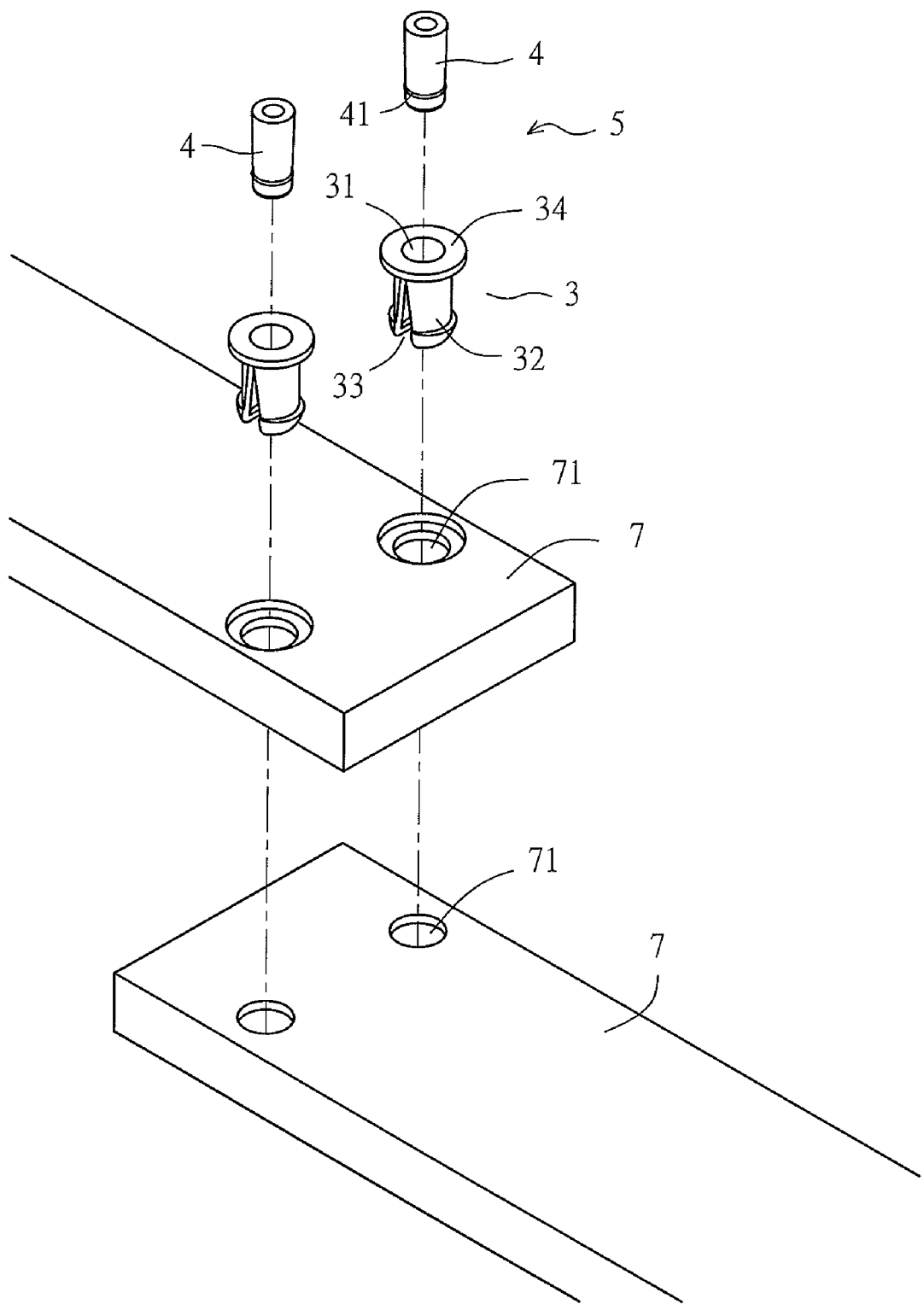
FIG. 10 is an exploded perspective view of fasteners according to the present invention.
Figure 11:
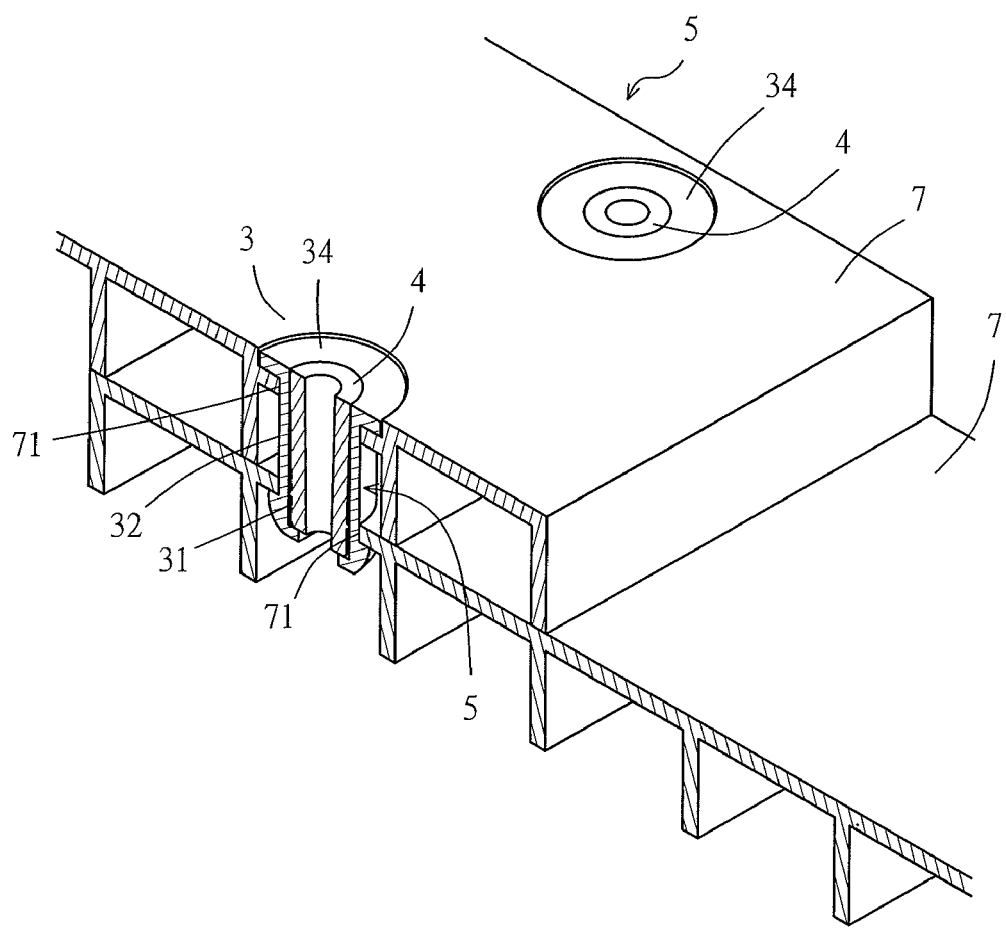
FIG. 11 is a sectional perspective view of the fasteners shown in FIG. 10, with the fasteners installed between two structural elements.

The aforesaid fasteners 5 are configured not only for fastening the structural elements of a pallet, but also for fastening any two connected structural elements. Referring to FIG. 10 and FIG. 11, with the fasteners 5 used to fasten two structural elements 7, each fastener 5 includes an engaging sleeve 3 and a pressing insert 4, as detailed below.

The engaging sleeve 3, which is formed of a tough plastic material, is penetrated by a hole 31, has an end formed as a resilient tenon section 32 having an opening 33, and further has an opposite end formed with a pressing flange 34.

The pressing insert 4, which is also formed of a tough plastic material, is provided with an upper section having a first outer diameter and a lower section having a second outer diameter. While the first outer diameter is larger than the second outer diameter, both the first and second outer diameters must be larger than the diameter of a hollow column formed by the hole 31 penetrating the engaging sleeve 3. In addition, the lower section of the pressing insert 4 is integrally formed with a projecting ring 41.

The fastener 5 composed of the plastic engaging sleeve 3 and the plastic pressing insert 4 is installed to the two structural elements 7 in the following manner. As shown in FIG. 11, the resilient tenon section 32 at one end of the engaging sleeve 3 is passed through corresponding holes 71 of the two structural elements 7 such that the upper and lower ends of the engaging sleeve 3 press against the outer surfaces of the two structural elements 7, respectively. Afterward, the pressing insert 4 is inserted into the hole 31 of the engaging sleeve 3. As a result, the ring 41 projecting from the pressing insert 4 is pushed against the wall of the hole 31 of the engaging sleeve 3. Thus, the fastener 5 is conveniently and rapidly installed between the two structural elements 7 to achieve tight and secure fastening.

Figure 12:
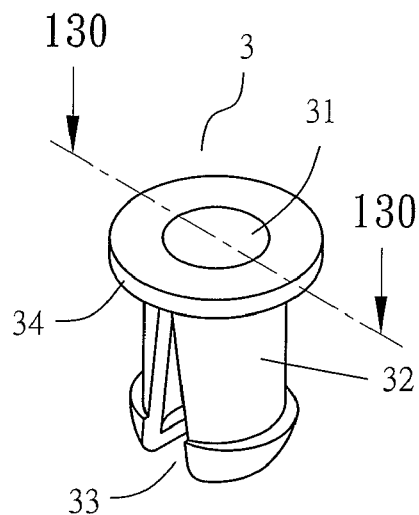
FIG. 12 is a perspective view of an engaging sleeve according to the present invention.
Figure 13:
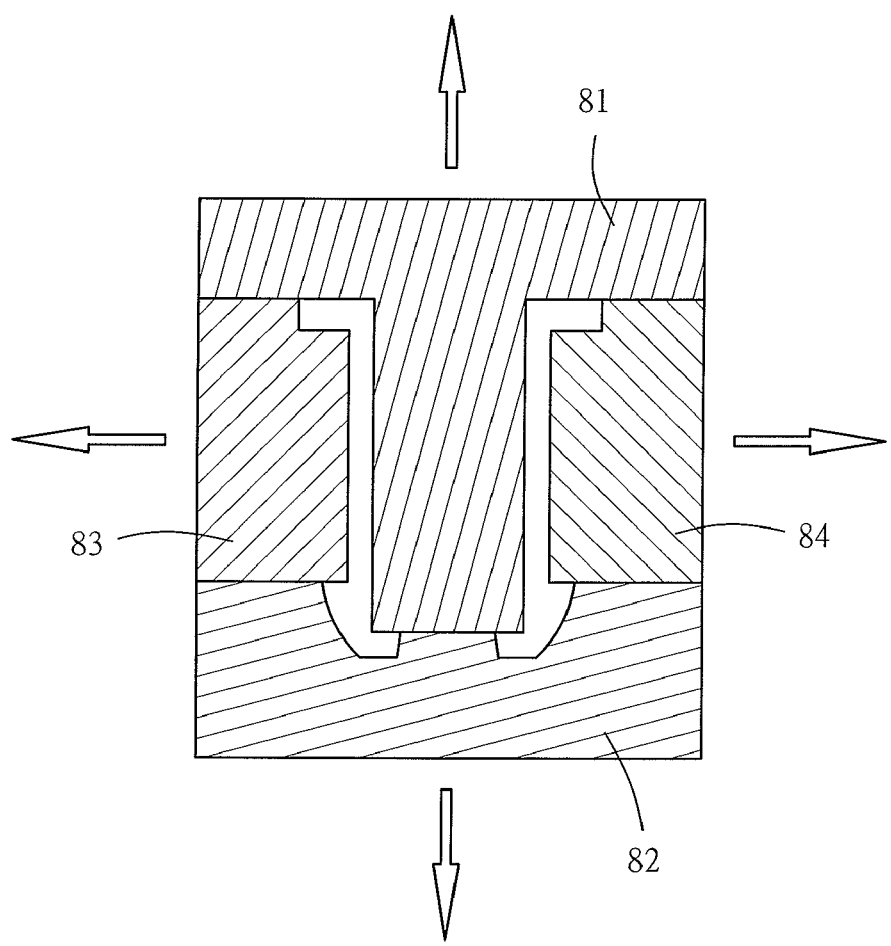
FIG. 13 is a sectional view of the engaging sleeve shown in FIG. 12, taken along line 130-130, and a mold for forming this engaging sleeve.

Referring to FIG. 12 and FIG. 13, the plastic engaging sleeve 3 that penetrates the two structural elements 7 is formed by an upper mold 81, a lower mold 82, a left mold 83, and a right mold 84. The upper mold 81 is manufactured according to the hole 31 of the engaging sleeve 3. The lower mold 82 is manufactured according to the resilient tenon section 32 located at one end of the engaging sleeve 3 and having the opening 33. The left mold 83 and the right mold 84 are manufactured according to the pressing flange 34 extending from the opposite end of the engaging sleeve 3. When formed, the engaging sleeve 3 can be easily released from the molds 81, 82, 83, and 84.

Figure 14:
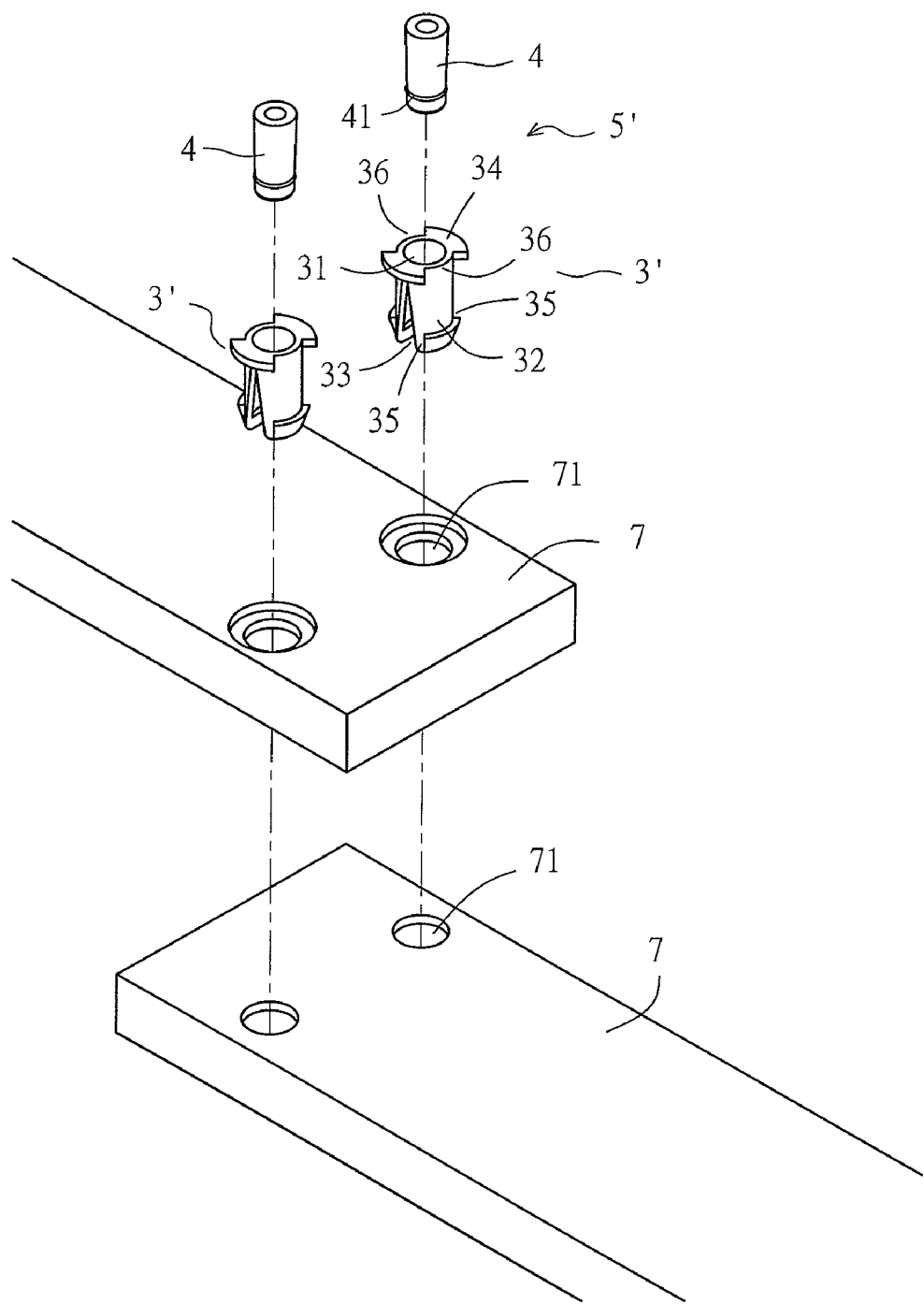
FIG. 14 is a perspective view of another embodiment of the fasteners according to the present invention, with the engaging sleeves having a different configuration from that shown in FIG. 12.
Figure 15:
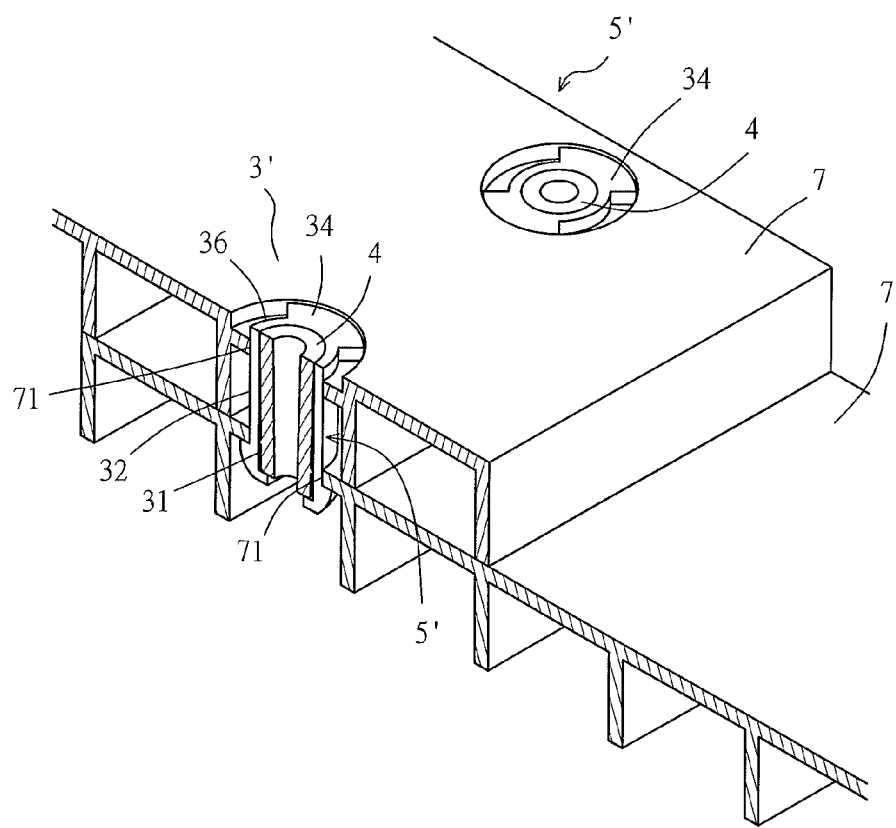
FIG. 15 is a sectional perspective view of the fasteners shown in FIG. 14, with the fasteners installed between two structural elements.

FIG. 14 demonstrates another embodiment of the foregoing fastener. As shown in the drawing, a fastener 5' for fastening two structural elements 7 is composed of an engaging sleeve 3' and a hollow pressing insert 4, both formed of a tough plastic material. While the pressing insert 4 in this embodiment is identical to that described with reference to FIG. 10 and FIG. 11, the engaging sleeve 3' that penetrates the two structural elements 7 is different from the engaging sleeve 3 in the previous embodiment. The engaging sleeve 3' is also formed of plastic, is also penetrated by a hole 31, also has an end formed as a resilient tenon section 32 having an opening 33, and also has an opposite end extended with a pressing flange 34. The engaging sleeve 3' is characterized in that the opening 33 is bilaterally provided with discontinuous sectors 35 and that the pressing flange 34 is bilaterally provided with discontinuous sectors 36 which alternate in position with the discontinuous sectors 35 at the opening 33. As shown in FIG. 15, the plastic engaging sleeve 3' works in conjunction with the plastic hollow pressing insert 4 inserted therein to tightly and securely fasten the two structural elements 7.

Figure 16:
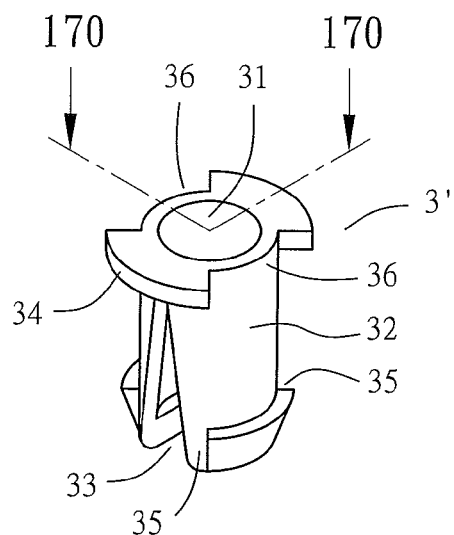
FIG. 16 is an enlarged perspective view of either one of the engaging sleeves shown in FIG. 14.
Figure 17:
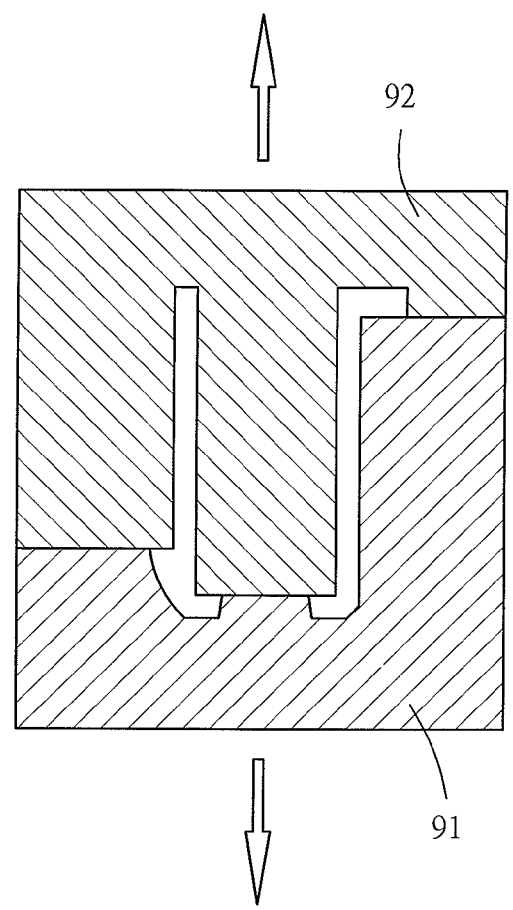
FIG. 17 is a sectional view of the engaging sleeve shown in FIG. 16, taken along line 170-170, and a mold for forming this engaging sleeve.

The plastic engaging sleeve 3' that penetrates the two structural elements 7 is formed by a lower mold 91 and an upper mold 92, as shown in FIG. 16 and FIG. 17. The lower mold 91 is manufactured according to the discontinuous sectors 35 bilaterally formed at the opening 33 of the resilient tenon section 32 at one end of the engaging sleeve 3'. The upper mold 92 is manufactured according to the hole 31 of the engaging sleeve 3' as well as the discontinuous sectors 36 that are bilaterally formed at the pressing flange 34 extending from the upper end of the engaging sleeve 3' and alternate in position with the discontinuous sectors 35 at the opening 33 of the resilient tenon section 32 at the lower end of the engaging sleeve 3'. Thus, the molds for forming the plastic engaging sleeve 3' are fewer than those for forming the plastic engaging sleeve 3.

The pallet component and fasteners disclosed herein have the following advantages in terms of manufacture and assembly:

1. The two outer unit members and the intermediate connector of the pallet component are formed by small molds, thus effectively lowering the mold manufacturing costs.

2. As the two outer unit members and the intermediate connector of the pallet component are small in volume, the pallet components can be stacked in a space-efficient way during transportation.

3. The molds for injection-molding each structural element of the pallet component can be accommodated in existing forming machines, thereby eliminating the need to use larger forming machines otherwise required by large molds. Thus, pallet components of different sizes can be made using existing forming machines in the factory.

4. The pallet components can be conveniently put together to form a stable pallet whose dimensions are tailored for the widths of objects to be placed on the pallet.

5. The fastener to be installed between the structural elements of the pallet component or any two structural elements is composed of the engaging sleeve and the pressing insert made of a tough plastic material and can tightly and securely fasten the structural elements of the pallet component or any two structural elements in a convenient and rapid way.

6. The plastic engaging sleeve of the fastener to be installed between the structural elements of the pallet component or any two structural elements can be formed by simple molds and be easily removed therefrom.

7. The plastic engaging sleeve of the other disclosed configuration is formed by upper and lower molds manufactured according to the alternately arranged discontinuous sectors at the upper and lower ends of the engaging sleeve, respectively, thereby reducing the number of molds for making the plastic engaging sleeve.

What is claimed is:

1. An assembly applicable to forming a pallet on which a variety of objects are placed and movable by a forklift, the assembly comprising:

a pallet component composed of at least two structural elements according to a predetermined size of the pallet component, wherein the pallet component comprises two outer unit members and an intermediate connector, with each said outer unit member having a side with spaced projections and spaced receiving recesses adjacent thereto, wherein the spaced projections of each said outer unit member correspond in position to and are received respectively in the spaced receiving recesses of the other outer unit member; and an intermediate connector bilaterally formed with connecting sections having different orientations, with each said connecting section having a working end with spaced projections and spaced receiving recesses adjacent thereto, wherein the spaced projections of each said connecting section of the intermediate connector are received respectively in the spaced receiving recesses of a corresponding one of the two outer unit members when the intermediate connector is assembled with the two outer unit members;

wherein a stable pallet is formed according to widths of objects placed on the pallet; mold manufacturing costs and production costs of the pallet are reduced; and a plurality of said pallet components are adapted to be space-efficiently stacked during transportation.

2. An assembly of a pallet component comprising fasteners configured for fastening two unit members and an intermediate connector that form the pallet component, with each said fastener comprising:

an engaging sleeve formed of a tough plastic material, penetrated by a hole, having an end formed as a resilient tenon section having an opening, and having an opposite end formed with a pressing flange; and a pressing insert formed of a tough plastic material and provided with an upper section having a first outer diameter and a lower section having a second outer diameter, with the first outer diameter being larger than the second outer diameter, with both the first outer diameter and the second outer diameter being larger than a diameter of a hollow column formed by the hole penetrating the engaging sleeve, wherein the lower section of the pressing insert is integrally formed with a projecting ring;

wherein each said fastener is installed in the pallet component by: passing the resilient tenon section at the end of the engaging sleeve through corresponding through-holes of the two unit members or one of said unit members and said intermediate connector with the end and the opposite end of the engaging sleeve pressed respectively against the two unit members or against the one unit member and the intermediate connector; and inserting the pressing insert into the hole of the engaging sleeve with the ring projecting from the pressing insert pressed against a wall of the hole of the engaging sleeve, with the fastener being conveniently and rapidly installed between the two unit members or between the one unit member and the intermediate connector to achieve tight and secure fastening.

3. The assembly of claim 2, wherein the plastic engaging sleeve installed between the two unit members or between the one unit member and the intermediate connector is formed by an upper mold manufactured according to the hole penetrating the engaging sleeve, a lower mold manufactured according to the resilient tenon section which has the opening and is at the end of the engaging sleeve, and a left mold and a right mold which are manufactured according to the pressing flange extending from the opposite end of the engaging sleeve.

4. The assembly of claim 2, wherein the opening of the resilient tenon section at the end of the plastic engaging sleeve penetrated by the hole and belonging to the fastener installed between the two unit members or between the one unit member and the intermediate connector is bilaterally provided with discontinuous sectors, and wherein the pressing flange extending from the opposite end of the engaging sleeve is bilaterally provided with discontinuous sectors which alternate in position with the discontinuous sectors at the opening of the resilient tenon section, with the plastic engaging sleeve and the plastic pressing insert inserted therein to hold the assembled pallet component tightly together.

5. The assembly of claim 4, wherein the engaging sleeve installed between the two unit members or between the one unit member and the intermediate connector is formed by a lower mold manufactured according to the discontinuous sectors bilaterally provided at the opening of the resilient tenon section at the end of the engaging sleeve and an upper mold manufactured according to the hole of the engaging sleeve and the discontinuous sectors which are bilaterally provided at the pressing flange extending from the opposite end of the engaging sleeve and which alternate in position with the discontinuous sectors at the opening of the resilient tenon section at the end of the engaging sleeve.

* * * * *